United States Patent
Lee et al.

(10) Patent No.: US 9,375,901 B2
(45) Date of Patent: Jun. 28, 2016

(54) CONDUCTIVE ELASTIC MEMBER

(71) Applicants: JOINSET CO., LTD., Ansan-si, Kyeonggi-do (KR); Sun-Ki Kim, Gunpo-si, Kyeonggi-do (KR)

(72) Inventors: Seong-Jin Lee, Ansan-si (KR); Hyun-Ill Lee, Ansan-si (KR); Eung-Won Kim, Ansan-si (KR); Sun-Ki Kim, Gunpo-si (KR); Byung-Sun Jung, Ansan-si (KR)

(73) Assignees: Joinset Co., Ltd. (KR); Sun-Ki Kim (KR)

( * ) Notice: Subject to any disclaimer, the term of this patent is extended or adjusted under 35 U.S.C. 154(b) by 0 days.

(21) Appl. No.: 14/602,642

(22) Filed: Jan. 22, 2015

(65) Prior Publication Data

US 2015/0213920 A1    Jul. 30, 2015

(30) Foreign Application Priority Data

Jan. 24, 2014 (KR) .................. 10-2014-0009210
Feb. 7, 2014  (KR) .................. 10-2014-0014415

(51) Int. Cl.

| | | |
|---|---|---|
| B32B 25/20 | (2006.01) | |
| B32B 5/18 | (2006.01) | |
| B32B 25/14 | (2006.01) | |
| B32B 7/12 | (2006.01) | |
| B32B 15/04 | (2006.01) | |
| B32B 15/14 | (2006.01) | |

(52) U.S. Cl.
CPC . *B32B 25/20* (2013.01); *B32B 5/18* (2013.01); *B32B 7/12* (2013.01); *B32B 15/046* (2013.01); *B32B 15/14* (2013.01); *B32B 25/14* (2013.01); *B32B 2255/02* (2013.01); *B32B 2255/102* (2013.01); *B32B 2255/205* (2013.01); *B32B 2255/26* (2013.01); *B32B 2264/10* (2013.01); *B32B 2266/0207* (2013.01); *B32B 2266/06* (2013.01); *B32B 2307/202* (2013.01); *B32B 2307/302* (2013.01); *B32B 2307/306* (2013.01); *B32B 2457/00* (2013.01); *Y10T 428/233* (2015.01); *Y10T 428/249958* (2015.04); *Y10T 442/10* (2015.04)

(58) Field of Classification Search
None
See application file for complete search history.

(56) References Cited

U.S. PATENT DOCUMENTS

| | | | | |
|---|---|---|---|---|
| 4,576,859 A | * | 3/1986 | Oyachi | H05K 9/0015 427/244 |
| 2011/0266031 A1 | * | 11/2011 | Kim | H01R 13/2414 174/126.2 |
| 2013/0251977 A1 | * | 9/2013 | Kim | C08K 3/08 428/308.4 |

FOREIGN PATENT DOCUMENTS

| | | |
|---|---|---|
| KR | 10-2010-0035887 A | 4/2010 |
| KR | 10-2013-0106749 A | 9/2013 |
| KR | 10-2013-0136240 A | 12/2013 |

*Primary Examiner* — Hai Vo
(74) *Attorney, Agent, or Firm* — Park & Associates IP Law, P.C.

(57) ABSTRACT

A conductive elastic member includes a polymer foamed body having elasticity and including an open cell structure having a sheet shape including a plurality of pores vertically connecting upper and lower sides without skin layers, conductive elastic rubber coating layers formed by adhering liquid elastic rubber including conductive particles mixed therein to the upper and lower sides of the polymer foamed body and inner surfaces of the pores by hardening, a conductive polymer cover layer formed by adhering liquid elastic polymers including conductive particles mixed therein to an upper side of the conductive elastic rubber coating layer formed on the upper side of the polymer foamed body by hardening the polymers, and a conductive base material adhered to a lower side of the conductive elastic rubber coating layer formed on the lower side of the polymer foamed body by hardening the elastic rubber.

10 Claims, 3 Drawing Sheets

CONDUCTIVE ELASTIC MEMBER

REFERENCE TO RELATED APPLICATIONS

This application claims the priority benefit of Korean Patent Application No. 10-2014-0009210 filed on Jan. 24, 2014, and Korean Patent Application No. 10-2014-0014415 filed on Feb. 7, 2014, the entire contents of which are incorporated herein by reference.

FIELD OF THE INVENTION

One or more embodiments of the present invention relate to a conductive elastic member, and more particularly, to a conductive elastic member including a cover layer including a smooth surface to easily perform vacuum pickup and to improve the conductivity of the surface and having elasticity with strong adhesive force.

BACKGROUND OF THE INVENTION

Not to send outward electric waves generated by electronic components or modules for high frequency used in electric devices or information communication devices or to protect internal electronic components or modules from external electric waves, electric wave-preventing gaskets having excellent restoring force and elasticity and high electrical conductivity with a low pressing force are used.

Since having high electrical conductivity, electroconductive gaskets or electroconductive-adhesive tapes may have low electrical resistance and may have excellent elasticity to be well restored by repetitively applied force.

To manufacture such electroconductive product, Korean Patent Publication No. 2013-0106749, applied and published by the present applicant, discloses a conductive polymer foaming elastomer including a polymer foamed body in an open cell structure in which plural pores are vertically connected without a skin layer on the upper and lower sides, non-foamed conductive polymer elastic coating layers which are connected to each other by being combined by hardening a liquid conductive polymer on the upper and lower sides of the polymer foamed body and inner surface of the pores, a solderable metal thin film adhered to the non-foamed conductive polymer elastic coating layer on one of the upper and lower sides by the hardening, and a conductive elastic member adhered to the non-foamed conductive polymer elastic coating layer on another of the upper and lower sides by the hardening. Regardless of the non-foamed conductive elastic coating layer, due to the open cell structure of the polymer foamed body located therein, the conductive polymer foaming elastomer has an open cell structure and the conductivity of the conductive polymer foaming elastomer increases when the conductive polymer foaming elastomer is pressurized to the vertical direction, by decreasing the floor space index of the pores.

However, according the described above, since the metal thin film or the conductive elastic member adhered to the upper side of the polymer is adhered by the hardening of the non-foamed conductive polymer elastic coating layer, the surface of the metal thin film or the conductive elastic member becomes uneven or rough, which makes vacuum pickup difficult.

Also, when the thickness of the non-foamed conductive polymer elastic coating layer on the upper side of the polymer foamed body is small, it is impossible to obtain adhesive force enough. Then, it is difficult to provide reliable adhesion with the metal thin film or the conductive elastic member adhered thereto.

Also, since it is difficult to provide the non-foamed conductive polymer elastic coating layer having a great thickness formed on the upper side of the polymer foamed body, the surface of the upper side has pores to have an open cell structure as the open cell structure of the polymer foamed body. When being rubbed, metal powder easily separates therefrom and electrical conductivity is low.

In the above, an elastomer having electrical conductivity has been described as an example. However, since being manufactured in the same way as described above, a thermal-conductive elastomer well transferring heat has similar disadvantages.

SUMMARY OF THE INVENTION

One or more embodiments of the present invention include a conductive elastic member having a smooth surface to easily perform vacuum pickup.

One or more embodiments of the present invention include a conductive elastic member allowing conductive powder to less separate therefrom when the surface thereof is rubbed.

One or more embodiments of the present invention include a conductive elastic member having a cover layer strongly adhered to an upper side of a polymer foamed body.

One or more embodiments of the present invention include a conductive elastic member having high conductivity in the surface direction.

One or more embodiments of the present invention include a conductive elastic member capable of being surface-mounted by vacuum pickup and being reflow-soldered using solder cream.

One or more embodiments of the present invention include a conductive elastic member including conductive adhesive tape having elasticity to be conveniently used.

One or more embodiments of the present invention include a conductive elastic member to be easily manufactured and having reliability.

Additional aspects will be set forth in part in the description which follows and, in part, will be apparent from the description, or may be learned by practice of the presented embodiments.

According to one or more embodiments of the present invention, a conductive elastic member having one of thermal conductivity and electrical conductivity includes a polymer foamed body having elasticity and including an open cell structure having a sheet shape including a plurality of pores vertically connecting upper and lower sides without skin layers, conductive elastic rubber coating layers formed by adhering liquid elastic rubber including conductive particles mixed therein to the upper and lower sides of the polymer foamed body and inner surfaces of the pores by hardening, a conductive polymer cover layer formed by adhering liquid elastic polymers including conductive particles mixed therein to an upper side of the conductive elastic rubber coating layer formed on the upper side of the polymer foamed body by hardening the polymers, and a conductive base material adhered to a lower side of the conductive elastic rubber coating layer formed on the lower side of the polymer foamed body by hardening the elastic rubber, in which the conductive polymer cover layer and the conductive base material are electrically or thermally connected to each other through the conductive elastic rubber coating layers formed on the upper and lower sides of the polymer foamed body and the inner surfaces of the pores.

The polymer foamed body may include one of polyurethane rubber, neoprene rubber, and silicone rubber.

The elastic rubber of the conductive elastic rubber coating layer may be one of urethane rubber and silicone rubber, and the conductive particles may include one of copper, nickel, silver, conductive carbon, conductive graphite, alumina, and boron.

A heat-resistant temperature of the conductive elastic rubber coating layer may be identical to or higher than a heat-resistant temperature of the polymer foamed body.

The conductive base material may be one of metal foil, metal-coated conductive fabric, and conductive mesh.

A conductive adhesive layer may be additionally formed on a lower side of the conductive base material, and a deformed sheet may be additionally attached to an exposed side of the conductive adhesive layer.

The conductive base material may be conductive adhesive tape.

The conductive base material may be solderable metal foil, and the polymer foamed body may satisfy a temperature condition of reflow soldering due to the conductive elastic rubber coating layer.

The conductive elastic member may be wrapped using reel tape and may be reflow-soldered through vacuum-picked up.

The conductive elastic member may have a maximum pressure rate of about 80% or less of an initial height and may be restored similarly to the initial height when pressing force is removed.

The conductive elastic rubber coating layer formed on the lower side of the polymer foamed body may form a skin layer, and more particularly, the conductive polymer cover layer may form a skin layer.

A lateral side of the polymer foamed body, on which the conductive elastic rubber coating layer is formed, may have an open cell structure due to the polymer foamed body.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE INVENTION

Hereinafter, embodiments of the present invention will be described in detail with reference to the attached drawings. Hereinafter, "conductivity" includes one or both of thermal conductivity or electrical conductivity.

Figure 1:
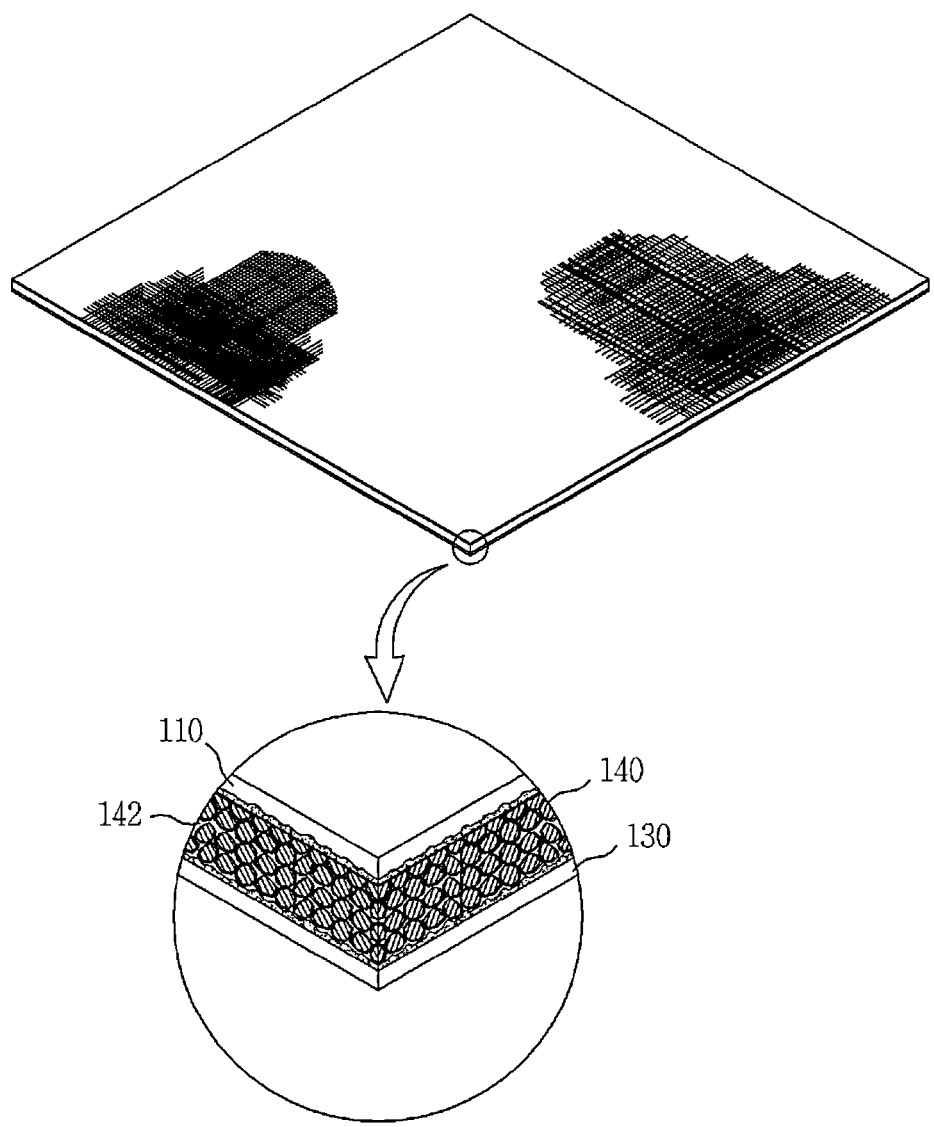
FIG. 1 illustrates a conductive elastic member according to an embodiment of the present invention.
Figure 2:
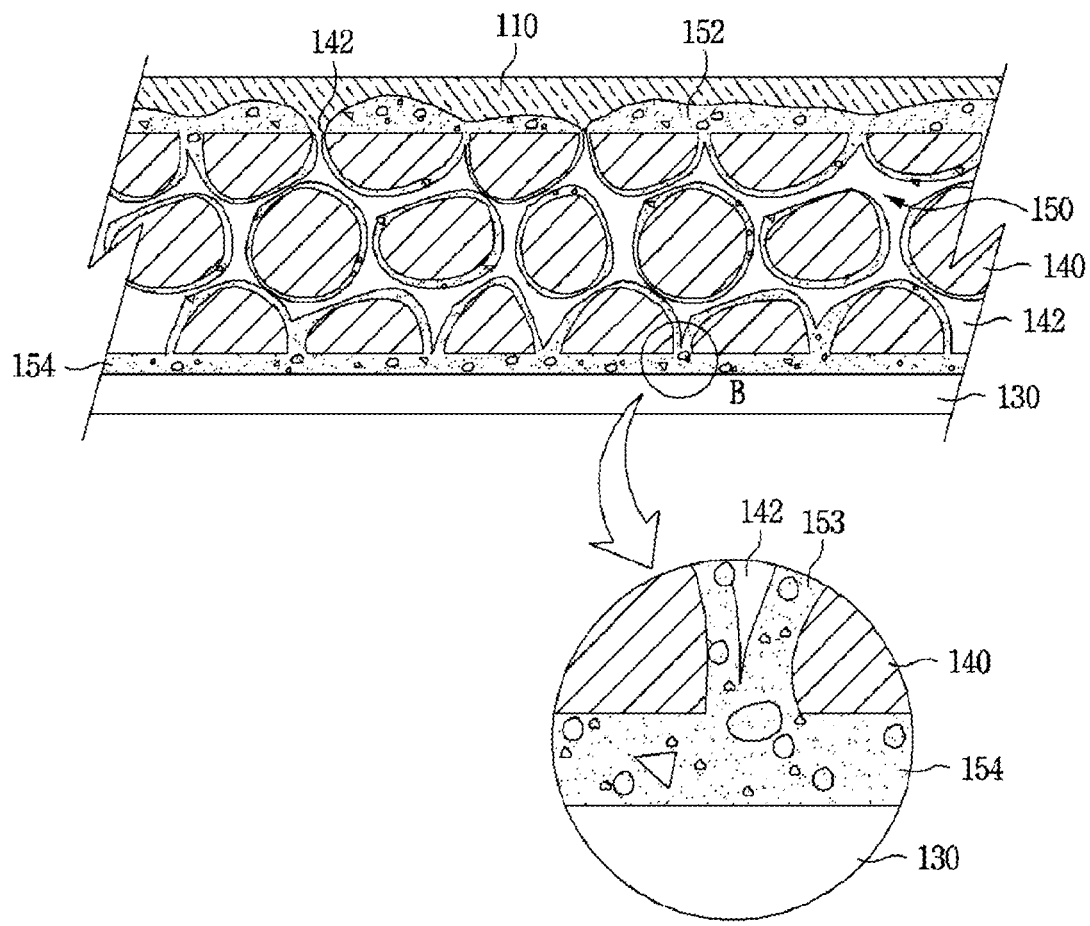
FIG. 2 is a cross-sectional view of the conductive elastic member partially cut.

FIG. 1 is a conductive elastic member according to an embodiment of the present invention, and FIG. 2 is a cross-sectional view of the conductive elastic member partially cut.

The conductive elastic member 100 includes a polymer foamed body 140 having an open cell structure including a plurality of pores 142, a conductive elastic rubber coating layer 150 adhered and formed by hardening a liquid conductivity polymer having evenly mixed conductive particles on upper and lower sides of the polymer foamed body 140 and on inner surfaces of the pores 142 to be electrically or thermally connected, a conductive polymer cover layer 110 adhered and formed on an upper side of a conductive elastic rubber coating layer 152 formed on the upper side of the polymer foamed body 140 by hardening of a liquid polymer having conductive particles mixed therewith, and a conductive base material 130 adhered to a lower side of a conductive elastic rubber coating layer 154 formed on the lower side of the polymer foamed body 140 by hardening of elastic rubber.

According to the structure, the conductive polymer cover layer 110 and the conductive base material 130 are electrically or thermally connected to each other through conductive elastic rubber coating layers 152, 153, and 154 formed on the upper and lower sides of the polymer foamed body 140 and the inner surfaces of the pores 142.

The pores 142, as well known, are formed by a chemical foaming agent and formed as a cavernous shape horizontally or vertically connected to each other and having open upper and lower sides in an open cell structure. The polymer foamed body 140 having the open cell structure generally has excellent elasticity and elasticity-restoring force with low pressing force due to the open pores 142.

As described above, the conductivity may have anyone of thermal conductivity and electrical conductivity or both of the same. In other words, the conductive elastic rubber coating layer 150 may have any of thermal-conductive particles and electroconductive particles or both of the same.

When the conductive elastic rubber coating layer 150 has electroconductive particles, upper and lower electrical conductivities may be 10Ω or lower but is not limited thereto and may be lower than electrical resistance of the polymer foamed body 140 to easily remove static electricity. Also, when the conductive elastic rubber coating layer 150 has thermal-conductive particles, thermal conductivity may be 0.8 W/m.k or higher but is not limited thereto and may be higher than thermal conductivity of the polymer foamed body 140.

According to the one or more embodiments of the present invention, the conductive elastic member 100 may have a thickness of about 2 mm or less and a maximum pressure rate of about 80% or less of an initial height, that is, a normal height not being pressed but is not limited thereto and may be restored similarly to the initial height when pressing force is removed. and The polymer foamed body 140 is manufactured using materials easy to manufacture an open cell structure. A heat-resistant temperature of the materials forming the polymer foamed body 140 may be identical to or lower than a heat-resistant temperature of materials forming the conductive elastic rubber coating layer 150. The materials may be one of polyurethane rubber, neoprene rubber, and silicone rubber.

The polymer foamed body 140 has the open cell structure, in which skin layers are not formed on the upper and lower sides and the pores 142 are sequentially formed vertically, and has a sheet shape having a uniform and small thickness of, for example, 1.5 mm or less but is not limited thereto.

An additional conductive polymer cover layer may be adhered to the upper side of the polymer foamed body 140, which will be described later.

As described above, since the polymer foamed body 140 easily manufactured to have the open cell structure is provided as an inner core, overall, the conductive elastic member 100 has excellent restoring force and elasticity with lower pressing force, is easily manufactured, and has high productivity.

The conductive elastic rubber coating layer 150 is formed of one of liquid electroconductive elastic rubber including evenly mixed electroconductive particles of at least one of copper, nickel, silver, conductive carbon, and conductive graphite and liquid thermal-conductive elastic rubber including evenly mixed ceramic thermal-conductive particles of at least one of alumina and boron. As the liquid elastic rubber, one of urethane rubber and silicone rubber may be used. Herein, eletroconductive particles and thermal-conductive particles may be mixed at the same time.

The electroconductive elastic rubber or thermal-conductive elastic rubber may be thermally hardened but is not limited thereto. The liquid electroconductive elastic rubber or liquid thermal-conductive elastic rubber, while being hardened, forms the conductive elastic rubber coating layer 150 self-adhered to one of the polymer foamed body 140 and the conductive base material 130 by hardening. That is, a liquid conductive elastic rubber adhesive corresponding to the conducive elastic rubber coating layer 150 are adhered to the polymer foamed body 140 and the conductive base material 130 by hardening, thereby forming the conductive elastic rubber coating layer 150.

The conductive elastic rubber coating layer 150 may be a non-foamed elastic rubber coating layer to have high elasticity and mechanical strength.

The polymer foamed body 140 and the conductive elastic rubber coating layer 150 may be formed of same materials or different materials. When the polymer foamed body 140 and the conductive elastic rubber coating layer 150 are formed of different materials, a heat-resistant temperature of the conductive elastic rubber coating layer 150 is identical to or higher than a heat-resistant temperature of the polymer foamed body 140 in such a way that a heat-resistant temperature of overall the conductive elastic member 100 is high. For example, a polymer of the polymer foamed body 140 may be polyurethane rubber having low heat resistance, and elastic rubber of the conductive elastic rubber coating layer 150 may be silicone rubber having high heat resistance and excellent elasticity.

According to the structure, when being under a reflow soldering condition with a high temperature or being used at a high temperature, the polymer foamed body 140 having the low heat-resistant temperature may be protected by the conductive elastic rubber coating layer 150.

Accordingly, it is impossible to satisfy the reflow soldering condition only using the polymer foamed body 140. However, when the conductive elastic rubber coating layer 150 is adhered to the polymer foamed body 140 to be integrated, the reflow soldering condition may be satisfied by the conductive elastic rubber coating layer 150.

Also, a heat-resistant temperature may be increased using the polymer foamed body 140 having the open cell structure without skin layers on the upper and lower sides, which may be easily manufactured at a relatively lower price, thereby providing proper quality at a reasonable price.

In addition, regardless of the conductive elastic rubber coating layer 150, the conductive elastic member 100 may be allowed to have an open cell structure using the open cell structure of the polymer foamed body 140 easily manufactured at a relatively lower price.

Also, due to the open cell structure of the polymer foamed body 140, it is easy to provide the liquid conductive elastic rubber to the upper and lower sides of the polymer foamed body 140 and the inner surfaces of the pores 142.

Also, due to the open cell structure of the polymer foamed body 140, when the conductive elastic member 100 is vertically pressed, vertical conductivity of the conductive elastic member 100 increases. When the thickness of the polymer foamed body 140 is reduced by applying pressure, the air is discharged outwards from the pores 142 to reduce a floor space index occupied by the pores 142, thereby increasing contact between the inner surfaces of the pores 142 or increasing the density of conductive particles to increase the conductivity of the conductive elastic rubber coating layer 153 formed on the inner surfaces of the pores 142.

Herein, a thickness of the conductive elastic rubber coating layer 153 formed on the inner surfaces of the pores 142 may be uniformly formed. However, for this, it is necessary to use nano-sized conductive particles. When only the nano-sized conductive particles are mixed with a liquid elastic rubber adhesive, electrical and thermal performances may be ununiform or may be low. Accordingly, nano-sized and micron-sized conductive particles having various shapes are used to allow conductive particles to protrude from the conductive elastic rubber coating layer 153 in such a way that the electrical or thermal conductivity of the conductive elastic rubber coating layer 153 may be high although the thickness of the conductive elastic rubber coating layer 153 is ununiform.

The size of conductive particles is not particularly limited but may be small not to block the pores 142.

Since the conductive elastic rubber coating layer 154 formed on the lower side of the polymer foamed body 140 forms a skin layer due to the conductive base material 130 and liquid elastic rubber forming the conductive elastic rubber coating layer 154 flows down due to own weight thereof to allow the density of the conductive particles to increase, the conductive elastic rubber coating layer 154 has more excellent thermal conductivity and electrical conductivity than those of the conductive elastic rubber coating layer 152 formed on the upper side of the polymer foamed body 140.

As a result thereof, the upper side and the lower side of the polymer foamed body 140 form skin layers due to the conductive polymer cover layer 110 and the conductive elastic rubber coating layer 154, respectively, and a lateral side of the polymer foamed body 140 has an open cell structure.

The conductive polymer cover layer 110, for example, may be formed by evenly sputtering conductive particles to liquid silicone rubber and may have a small thickness of about 0.01 mm.

The conductive polymer cover layer 110 may be adhered to the conductive elastic rubber coating layer 152 by hardening liquid silicone rubber forming the conductive polymer cover layer 110.

According to the structure, since the conductive polymer cover layer 110 is formed by laminating and vertically pressing the conductive elastic rubber coating layer 152 formed on the upper side of the polymer foamed body 140 to the liquid silicone rubber to be in contact with the liquid silicone rubber and attached thereto while the liquid silicone rubber is applied to a protecting film and hardening the liquid silicone rubber, the surface of the conductive polymer cover layer 110 becomes smooth by the protecting film supporting while being underneath the same, thereby easily perform vacuum-pickup.

As described above, due to the conductive polymer cover layer 110, it is possible to provide a smooth and beautiful external shape, to easily perform vacuum pickup, and to prevent separation of the conductive particles sputtered in the conductive elastic rubber coating layer 152.

Also, since being adhered by hardening the liquid silicone rubber forming the conductive polymer cover layer 110, the conductive polymer cover layer 110 is strongly adhered to the polymer foamed body 140 by applying a sufficient amount of the liquid silicone rubber. Also, it is unnecessary to consider a thickness or volume of the conductive elastic rubber coating layer 152 formed on the upper side of the polymer foamed body 140.

Also, the conductive polymer cover layer 110 is provided, thereby greatly increasing horizontal conductivity. That is, electrical conductivity and the thermal conductivity of the conductive polymer cover layer 110 are higher than electrical conductivity and the thermal conductivity of overall the conductive elastic rubber coating layer 150. Also, for example, when a conductive elastic member 200 (refer to FIG. 4) is installed as a greater size than a heat source and is used as heat-dissipation material, thermal conductivity in a horizontal direction functions as a main cause of heat dissipation.

As the conductive base material 130, one of metal-coated conductive fabric, conductive mesh, and metal foil such as copper foil and aluminum foil may be used. When tin-coated copper foil is used, soldering is easy. When conductive fabric or mesh is used, flexibility is provided. However, when the conductive elastic member 100 is thermally conductive, the conductive fabric or mesh may be very restrictively used considering thermal conductivity.

When the conductive elastic member 100 is used as an electric terminal, an electroconductive gasket, or a thermal terminal, which is solderable, the conductive base material 130 may be formed of solderable metal foil. In this case, the conductive elastic member 100 is wrapped using reel tape and reflow-soldered through vacuum pickup.

Regardless of using the conductive elastic member 100 as the electric terminal, electroconductive gasket, or the thermal terminal, which is solderable, horizontal conductivity greatly increases by providing the conductive base material 130. That is, the electrical conductivity and thermal conductivity of overall the conductive base material 130 are higher than the electrical conductivity and thermal conductivity of overall the conductive elastic rubber coating layer 150.

Figure 3:
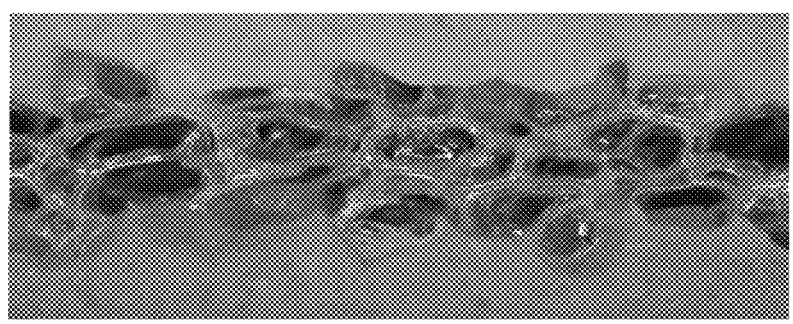
FIG. 3 is a picture of the lateral side of the conductive elastic member.

FIG. 3 is a picture of the lateral side of the conductive elastic member 100, which is a 30 times enlarged-side view of a real product of the conductive elastic member 100, in which conductive silicone rubber coating layers are adhered to an upper side and a lower side of an urethane rubber foamed body having a sheet shape having an open cell structure and parts of pores on a conductive base material by hardening.

Figure 4:
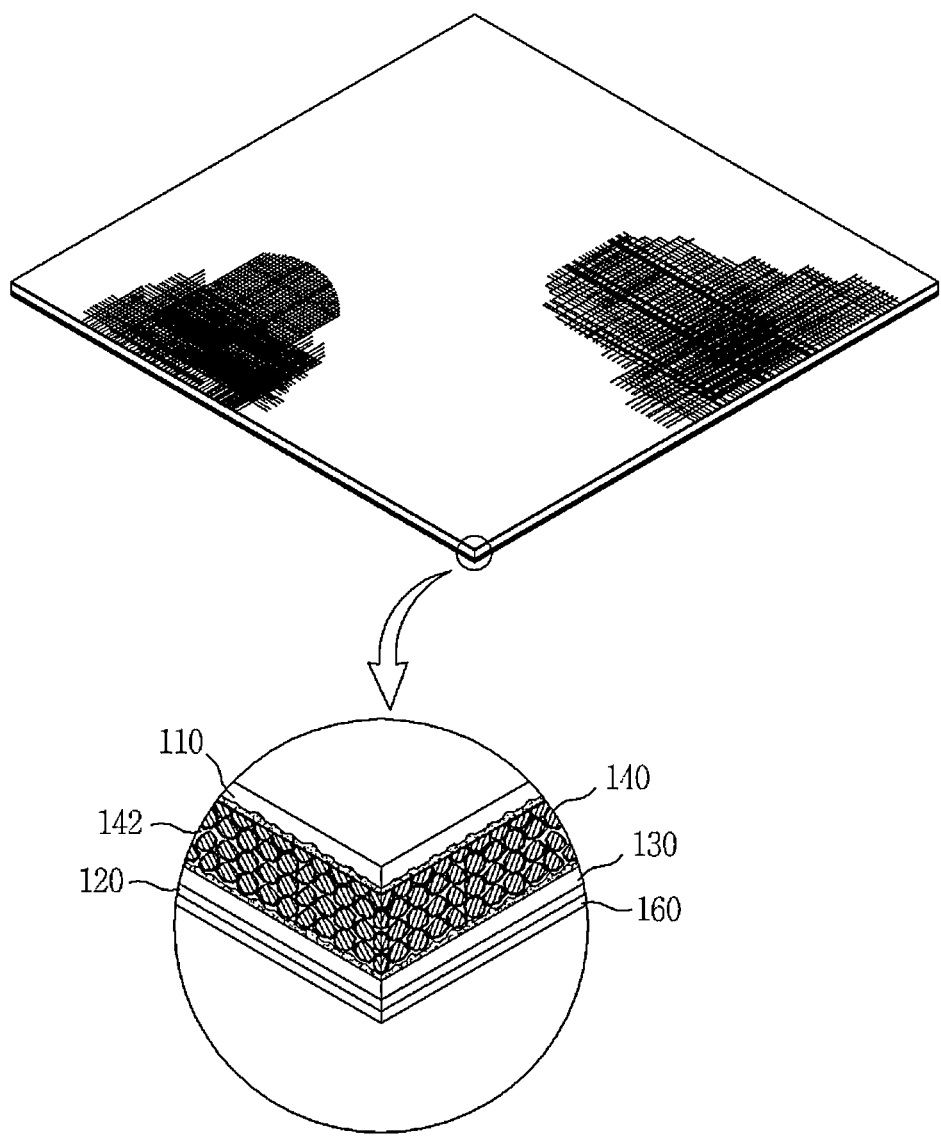
FIG. 4 illustrates a conductive elastic member according to another embodiment of the present invention.

FIG. 4 illustrates the conductive elastic member 200 according to another embodiment of the present invention.

A conductive adhesive layer 120 is additionally laminated onto a lower side of the conductive base material 130 in such a way that the conductive base material 130 forms conductive adhesive tape.

In this case, a deformed sheet 160 may be adhered to a lower side of the conductive adhesive layer 120 and one of deformed paper and a deformed film, which is weakly adhered to the conductive adhesive layer 120, may be used as the deformed sheet 160.

The conductive adhesive layer 120 may be formed by mixing a polymer adhesive, which has pressure-sensitive adhesive force such as acryl and urethane, with particles of one of copper, nickel, and carbon. The conductive adhesive layer 120 may have pressure-sensitive adhesive force.

The conductive elastic member 200 may be manufactured by attaching the deformed sheet 160 to the lower side of the conductive base material 130 interposing the conductive adhesive layer 120 therebetween or manufactured using the conductive base material 130 already having the conductive adhesive layer 120 with the deformed sheet 160 attached thereto.

As described above, according to the one or more of the above embodiments of the present invention, since a conductive polymer cover layer is formed by laminating and vertically pressing a conductive elastic rubber coating layer formed on an upper side of a polymer foamed body to liquid silicone rubber to be in contact with the liquid silicone rubber and attached thereto while the liquid silicone rubber is applied to a protecting film and hardening the liquid silicone rubber, a surface of the conductive polymer cover layer becomes smooth by a protecting film supporting the same, thereby easily perform vacuum-pickup. That is, the conductive polymer cover layer having a uniform thickness and a flat upper side is provided in such a way that a conductive elastic member has a smooth surface having a skin layer formed thereon.

As described above, due to the conductive polymer cover layer, it is possible to provide a smooth and beautiful external shape and to easily perform vacuum pickup. Also, pores having an open cell structure of the polymer foamed body are not formed on the surface, thereby easily preventing separation of the conductive particles sputtered in the conductive elastic rubber coating layer when being rubbed.

Also, since being adhered by hardening liquid conductive silicone rubber forming the conductive polymer cover layer, the conductive polymer cover layer is strongly adhered to the polymer foamed body by applying a sufficient amount of the liquid conductive silicone rubber to have a uniform thickness. Also, it is unnecessary to consider a thickness or volume of the conductive elastic rubber coating layer formed on the upper side of the polymer foamed body.

Also, the conductive polymer cover layer is provided, thereby greatly increasing horizontal conductivity. That is, electrical conductivity and the thermal conductivity of the conductive polymer cover layer are higher than electrical conductivity and the thermal conductivity of overall the conductive elastic rubber coating layer. Also, for example, when a conductive elastic member is used as electroconductive materials, since horizontal electrical conductivity of the upper side is higher than vertical electrical conductivity, electric contact resistance against an opposite object is reduced and electromagnetic shielding effects are higher.

Also, due to inner surfaces of the pores formed in the open cell structure and the conductive elastic rubber coating layer formed on upper and lower sides thereof, conductivity increases when the open cell structure is pressed by external applied force.

Also, a heat-resistant temperature is high, the surface is level, and metal foil is formed on another surface, thereby allowing surface-mounting by vacuum pickup and allowing reflow-soldering using solder cream.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A conductive elastic member having a sheet shape with one or both of thermal conductivity and electrical conductivity, the conductive elastic member comprising:
   a polymer foamed body having elasticity and an open cell structure, and having a sheet shape with a plurality of pores connecting through upper and lower sides of the polymer foamed body;
   conductive elastic rubber coating layers formed, by applying and hardening liquid elastic rubber with conductive particles mixed therein, on the upper and lower sides of the polymer foamed body and through inner surfaces of the pores;

a conductive polymer cover layer formed, by applying and hardening liquid elastic polymers with conductive particles mixed therein, on an upper side of the conductive elastic rubber coating layer formed on the upper side of the polymer foamed body; and a conductive base material adhered to a lower side of the conductive elastic rubber coating layer formed on the lower side of the polymer foamed body, wherein the conductive elastic rubber coating layer formed on the lower side of the polymer foamed body forms a skin layer, and a lateral side of the sheet shaped conductive elastic member defines an open cell structure which is at least partially exposed, wherein the conductive polymer cover layer and the conductive base material are electrically or thermally connected to each other through the conductive elastic rubber coating layers formed on the upper and lower sides of the polymer foamed body and the inner surfaces of the pores, wherein the polymer foamed body, the conductive polymer cover layer and the conductive base material are co-extensive with each other.

2. The conductive elastic member of claim 1, wherein the polymer foamed body comprises one of polyurethane rubber, neoprene rubber, and silicone rubber.

3. The conductive elastic member of claim 1, wherein the elastic rubber of the conductive elastic rubber coating layer is one of urethane rubber and silicone rubber, and wherein the conductive particles comprise one of copper, nickel, silver, conductive carbon, conductive graphite, alumina, and boron.

4. The conductive elastic member of claim 1, wherein a heat-resistant temperature of the conductive elastic rubber coating layer is identical to or higher than a heat-resistant temperature of the polymer foamed body.

5. The conductive elastic member of claim 1, wherein the conductive base material is one of metal foil, metal-coated conductive fabric, and conductive mesh.

6. The conductive elastic member of claim 1, wherein a conductive adhesive layer is additionally formed on a lower side of the conductive base material.

7. The conductive elastic member of claim 1, wherein the conductive base material is conductive adhesive tape.

8. The conductive elastic member of claim 1, wherein the conductive base material is solderable metal foil, and wherein the polymer foamed body satisfies a temperature condition of reflow soldering due to the conductive elastic rubber coating layer.

9. The conductive elastic member of claim 8, wherein the conductive elastic member is wrapped using reel tape and is reflow-soldered through vacuum-picked up.

10. The conductive elastic member of claim 1, wherein the conductive elastic member has a maximum pressure rate of about 80% or less of an initial height and is restored similarly to the initial height when pressing force is removed.

* * * * *